(12) United States Patent
Chou

(10) Patent No.: US 10,749,920 B2
(45) Date of Patent: Aug. 18, 2020

(54) MONITORING SYSTEM AND WIRELESS COMMUNICATION SYSTEM EQUIPPED THEREWITH

(71) Applicant: FG Innovation Company Limited, Tuen Mun (HK)

(72) Inventor: Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 204 days.

(21) Appl. No.: 16/001,911

(22) Filed: Jun. 6, 2018

(65) Prior Publication Data

US 2018/0359299 A1 Dec. 13, 2018

Related U.S. Application Data

(60) Provisional application No. 62/517,196, filed on Jun. 9, 2017.

(51) Int. Cl.
| | |
|---|---|
| *H04N 7/18* | (2006.01) |
| *G06K 9/00* | (2006.01) |
| *H04L 29/06* | (2006.01) |
| *H04W 76/27* | (2018.01) |
| *G06T 7/70* | (2017.01) |
| *H04W 36/08* | (2009.01) |
| *H04W 36/32* | (2009.01) |

(52) U.S. Cl.
CPC ............... *H04L 65/60* (2013.01); *G06T 7/70* (2017.01); *H04L 65/4084* (2013.01); *H04L 65/605* (2013.01); *H04W 36/08* (2013.01); *H04W 36/32* (2013.01); *H04W 76/27* (2018.02); *G06T 2207/30241* (2013.01)

(58) Field of Classification Search
USPC ....... 382/100, 103, 106–107, 156, 168, 173, 382/181, 199, 209, 219, 232, 254, 274, 382/276, 286–291, 305, 312; 455/7; 348/E7.079, 94; 370/329
See application file for complete search history.

(56) References Cited

U.S. PATENT DOCUMENTS

| | | | |
|---|---|---|---|
| 6,980,485 B2* | 12/2005 | McCaskill | G01S 3/8083 348/E7.079 |
| 2015/0049681 A1* | 2/2015 | Huang | H04W 72/1289 370/329 |
| 2016/0014668 A1* | 1/2016 | Chou | H04W 76/14 455/7 |
| 2016/0234726 A1* | 8/2016 | Nuggehalli | H04W 36/0022 |
| 2016/0338073 A1* | 11/2016 | Nuggehalli | H04W 72/10 |

FOREIGN PATENT DOCUMENTS

| | | |
|---|---|---|
| CN | 103974412 A | 8/2014 |
| CN | 106797543 A | 5/2017 |
| CN | 101277422 A | 10/2018 |

* cited by examiner

*Primary Examiner* — Seyed H Azarian
(74) *Attorney, Agent, or Firm* — ScienBiziP, P.C.

(57) ABSTRACT

A base station is provided. The base station comprises a processor configured to receive beam related information from a user equipment (UE), determine a position of the UE in response to the beam related information and acquire a video stream from at least on video capturing device configured on the base station in response to the position.

16 Claims, 6 Drawing Sheets

MONITORING SYSTEM AND WIRELESS COMMUNICATION SYSTEM EQUIPPED THEREWITH

CROSS REFERENCE TO RELATED APPLICATIONS

This application claims the benefit of and priority to U.S. Provisional Application No. 62/517,196 filed on Jun. 9, 2017 and entitled "8K MONITORING SYSTEM,".

TECHNICAL FIELD

The present disclosure generally relates to a monitoring system, and particularly, to a wireless communication system equipped with the monitoring system.

BACKGROUND

Since high resolution video streaming has to be supported by high bitrate transmission, it is expected that 8K film/video transmission over the air will require a lot of transmission bandwidth. Currently, the 4G Long Term Evolution (LTE) cellular system is not sufficient to provide 8K film/video streaming service to subscribers. The next generation cellular system, such as a fifth generation new radio (5G NR) cellular system, may be an appropriate vehicle for 8K film/video transmission.

Table 1 shows the bitrate requirements for different video compression technologies and the simplified calculation results of how much bandwidth is required for 8K film/video transmission in 4G and 5G systems. In addition, in Table 1, the bitrate requirements for transmission of 8K video at 60 and 120 frame per second (fps) are shown.

TABLE 1

Bitrate Requirements for 8k Film/Video Transmissions

| | | without compression | | with compression | | |
|---|---|---|---|---|---|---|
| | | | Bit | via different codec | | |
| Sample format | depth (bit) | Baseband (Mbps) | AVC (Mbps) | HEVC (Mbps) | FVC (Mbps) | |
| 8K@60 fps | 422 | 10 | 56953 | 170 | 85 | 43 |
| 8K@120 fps | 422 | 10 | 113906 | 238 | 119 | 60 |

SUMMARY

In one aspect of the present disclosure, a base station is provided. The base station comprises a non-transitory machine-readable medium storing computer-executable instructions; and a processor coupled to the non-transitory machine-readable medium and configured to execute the computer-executable instructions to receive beam related information from a user equipment (UE), determine a position of the UE in response to the beam related information, and acquire a video stream from at least one video capturing device configured on the base station in response to the position.

In another aspect of the present disclosure, a user equipment (UE) is provided. The UE comprises a non-transitory machine-readable medium storing computer-executable instructions; and a processor coupled to the non-transitory machine-readable medium and configured to execute the computer-executable instructions to transmit beam related information to a base station equipped with at least one video capturing device, receive a capability information of the at least one video capturing device via radio resource control (RRC) signaling, and receive a video stream from the base station in response to the capability information.

In yet another aspect of the present disclosure, a monitoring system is provided. The monitoring system comprises a non-transitory machine-readable medium storing computer-executable instructions; and a processor coupled to the non-transitory machine-readable medium and configured to execute the computer-executable instructions to receive beam related information of a user equipment (UE) from a base station coupled to the UE, determine a position of the UE in response to the beam related information and receive a video stream from at least one video capturing device configured on the base station in response to the position.

DETAILED DESCRIPTION

Figure 1:
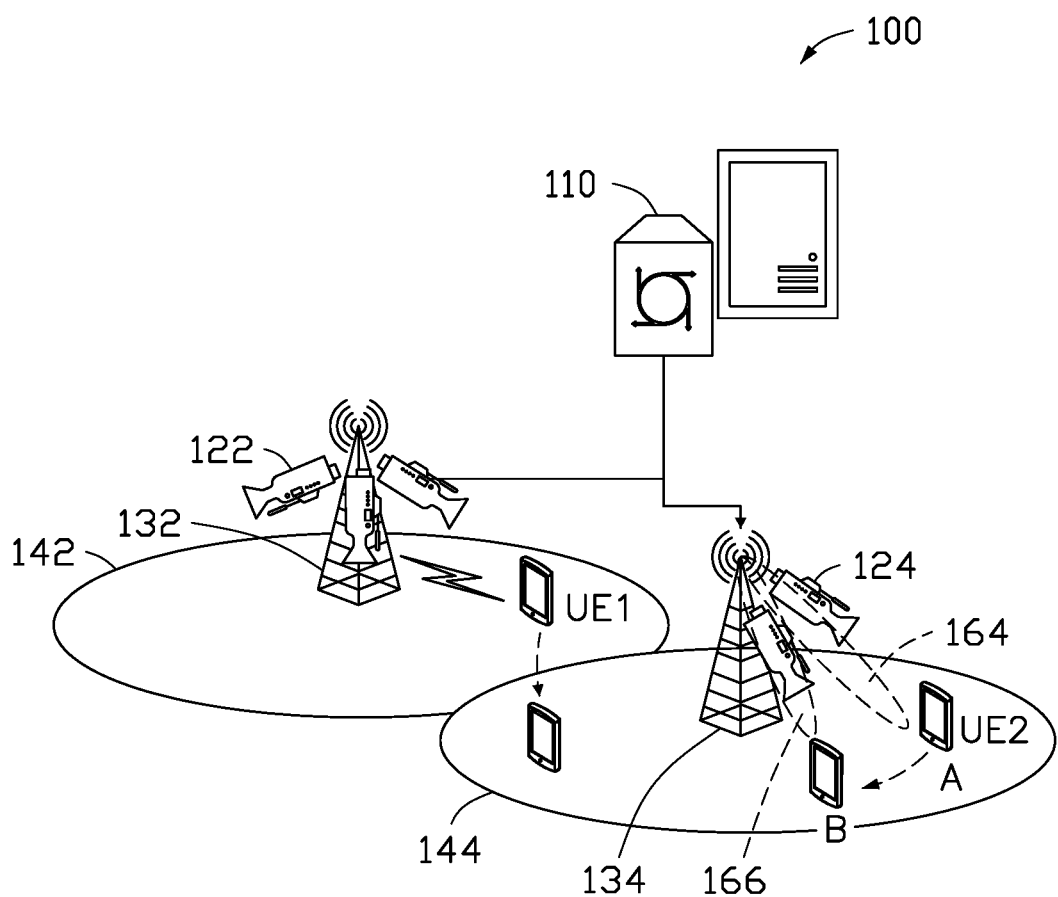
FIG. 1 is a schematic diagram illustrating a monitoring system according to an exemplary implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

It is noted that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a personal digital assistant (PDA), or a television display with wireless communication capability. The UE is configured to receive and transmit signals over an air interface to one or more cells in a radio access network.

A base station may include, but is not limited to a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G Access Network (5G-AN), and any other apparatus capable of controlling radio communication with cellular positioning technology and managing radio resources within a cell. The base station may connect to serve the one or more UEs through a radio interface to the network.

FIG. 1 is a schematic diagram illustrating a monitoring system according to an exemplary implementation of the present disclosure. The monitoring system is coupled to a wireless communication system 100. The wireless communication system 100 includes base stations 132 and 134, UEs 1 and 2, and a core network (not explicitly shown). The monitoring system 100 includes a processor 110. The processor 110 is coupled to at least one video capturing devices 122 and 124, and configured to receive video stream(s) from the video capturing devices 122 and 124. The processor 110 is configured to encode, decode or record video streams from the video capturing devices 122 and 124. The processor 110 may be integrated into any device including, but not limited to, a base station, a video capturing device, an image server or the core network.

The video capturing device 122 is configured on the base station 132 with coverage 142. The video capturing device 124 is configured on the base station 134 with coverage 144. In one implementation, the video capturing device is a high-resolution video capturing device, such as an 8 k camera. Each of the video capturing devices may be pre-configured to take films or video streams from any direction, angle and region.

In one implementation, the coverage of the base station may be divided into multiple sectors with respective angles (e.g., 120 degrees for each of the three sectors). Each of the video capturing devices takes images and/or records video streams with the each sector. In some implementations, the video capturing devices may not be limited to be mounted on the base station. That is, the video capturing devices may be installed at any place as long as the video capturing devices can be configured to capture images/video streams over a desired area and communicatively coupled to the base station.

In this implementation, a wireless connection between the UE 2 and the base station 134 is established via a beam 164, where the base station 134 may identify where the UE 2 is in response to beam related information of the beam 164.

During the wireless connection establishment, the base station 134 sends multiple directional signals via multiple beams to the UE 2 by performing beam sweeping over different directions within each of sectors. The UE 2 measures the multiple directional signals sent via the corresponding beams and provides a beam measurement report to the base station 134. According to the received beam measurement report, the base station 134 determines a serving beam which is optimized for the wireless connection between the UE 2 and the base station 134. That is, the base station 134 identifies the position of the UE 2 by determining the serving beam with reference to the beam measurement report that the UE 2 sends to the base station 134. After the serving beam is determined and the wireless connection is established, the base station 134 can identify the position of the UE 2 in response to information related to the serving beam. In FIG. 1, the beam 164 is determined as the serving beam for the UE 2.

Furthermore, the base station 134 sends measurement and report configuration for beam measurement to the UE 2 through radio resource control (RRC) signaling. The measurement and report configuration provides details to the UE 2 with regard to how to measure reference signal received power (RSRP) of beams provided from the base station 134. The information carried in the measurement and report configuration may include the measurement frequency, period and reference signal configuration. In particular, the measurement configuration includes an information element (IE) that enables UE 2 to measure the RSRP of beams and provide a specific measurement report of the base station 134. The UE 2 triggers the measurement report based on the report configuration provided by the base station 134. The measurement report includes an IE that contains the specific measurement report of the base station 134. For example, according to the report configuration, when the measured RSRP of the base station 134 becomes higher than a predetermined threshold, UE 2 may take measurements of the reference signal from the base station 134 based on the measurement configuration. UE 2 then provides a specific measurement report of beams in the measurement report to the base station 134. In the present implementation, the specific measurement report of the base station 134 contains details about the measured RSRP value(s) toward the specific reference signaling and other measurement information, such as the synchronization signal (ss) block index, Channel State Information Reference Signaling (CSI-RS) configuration index and System Frame Number (SFN). It is noted that UE 2 can select a qualified downlink (DL) reception beam for data transmission, while UE 2 performs measurements of the base station 134.

After the wireless connection is established, the base station 134 may trace the movement of the UE 2 by performing beam tracking. During the beam tracking, the base station 134 scans the area where the UE 2 is located frequently and adaptively switches to the beam optimized for serving the UE 2. In FIG. 1, as the UE 2 moves from point A to B, the base station 134 has the serving beam switched from beam 164 to beam 166 so that the movement of the UE 2 by the beam tracking.

Therefore, when receiving the beam related information from the UE 2, the base station 134 may determine a position of the UE 2 in response to the beam related information and select or configure the corresponding video capturing device (e.g., 124) to capture motions or record video streams of UE 2 in response to the position of the UE 2. When a user equipment UE 2 migrates within the cellular network, the cellular network may be aware of where the UE 2 is based on the beam related information, such as cell selection/reselection and relative positioning mechanism. In one implementation, the core network may check System Architecture Evolved (SAE)-Temporary Mobile Subscriber Identity (S-TMSI) or 5G S-TMSI of UE 2 and recognize the camping cell ID of the UE 2 to identify where the UE 2 is.

In one implementation, the beam related information relates to a mobility management procedure. For example, when a UE moves from a source base station to a target base station (e.g., the UE 1 moves from the base station 132 to the base station 134, a handover (HO) process may be initiated when the UE 1 is in RRC connected state, or a RAN notification area (RNA) update process may be initiated when UE 1 is in RRC inactive state, or a core network update process may be initiated when UE 1 is in RRC idle state). When a mobility management procedure is initiated, the position of the UE may be identified and a corresponding video capturing device may be selected by the core network to capture the specific UE. Accordingly, the UE's context and video stream configuration may be transmitted from the source base station to the target base station.

In another implementation, when the UE moves within the same base station, the serving beam for the UE may be changed. The base station may identify the position of the UE by utilizing beam association and management to acquire the images/video streams of the UE from the configured video capturing device.

In some implementations, by using an image processing technology, the video capturing device may zoom in or out the recorded images/video streams with appropriate resolution (e.g., 8K or 4K resolution) for displaying on UE 2. In some other implementations, a user profile (e.g., user's ID or photos) may be pre-configured by the UE 2 and uploaded to the core network for further imaging process applications. After captured images/video streams being decoded, the processor 110 may store the images/video streams and stream them to the UE 2. A user of the UE 2 may watch the images/videos by streaming in real-time or download them wirelessly.

In one implementation, the UE may be implemented as an automobile embedded with a wireless communication function or a mobile device installed in an automobile. When a car accident happened, the images/video streams may be acquired by the exemplary monitoring system of the present disclosure. For example, the base station equipped with video capturing devices suitable for capturing images/videos of the accident may be identified. Then, the core network may provide the images/video streams to the UE. Through video stream downloading, a real-time high resolution image/video stream may be obtained.

In another implementation, the UE may be implemented as a wireless communication dongle (e.g., 5G NR wireless communication) integrated to a display (e.g., an 8K TV), where the display is located in a house of a user. By tracing the position of the wireless communication dongle via an associated base station, the core network may recognize the appropriate video capturing device to record images/video streams for the user. The images/video streams may be a surrounding view of the house or an image of an object in which the user is interested. The wireless communication dongle may download the video streams and display it on the screen. Furthermore, the dongle may be communicatively coupled to a wireless communication devices brought by the family members so that the video streams may be watched on the wireless communication devices remotely from the house.

Figure 2:
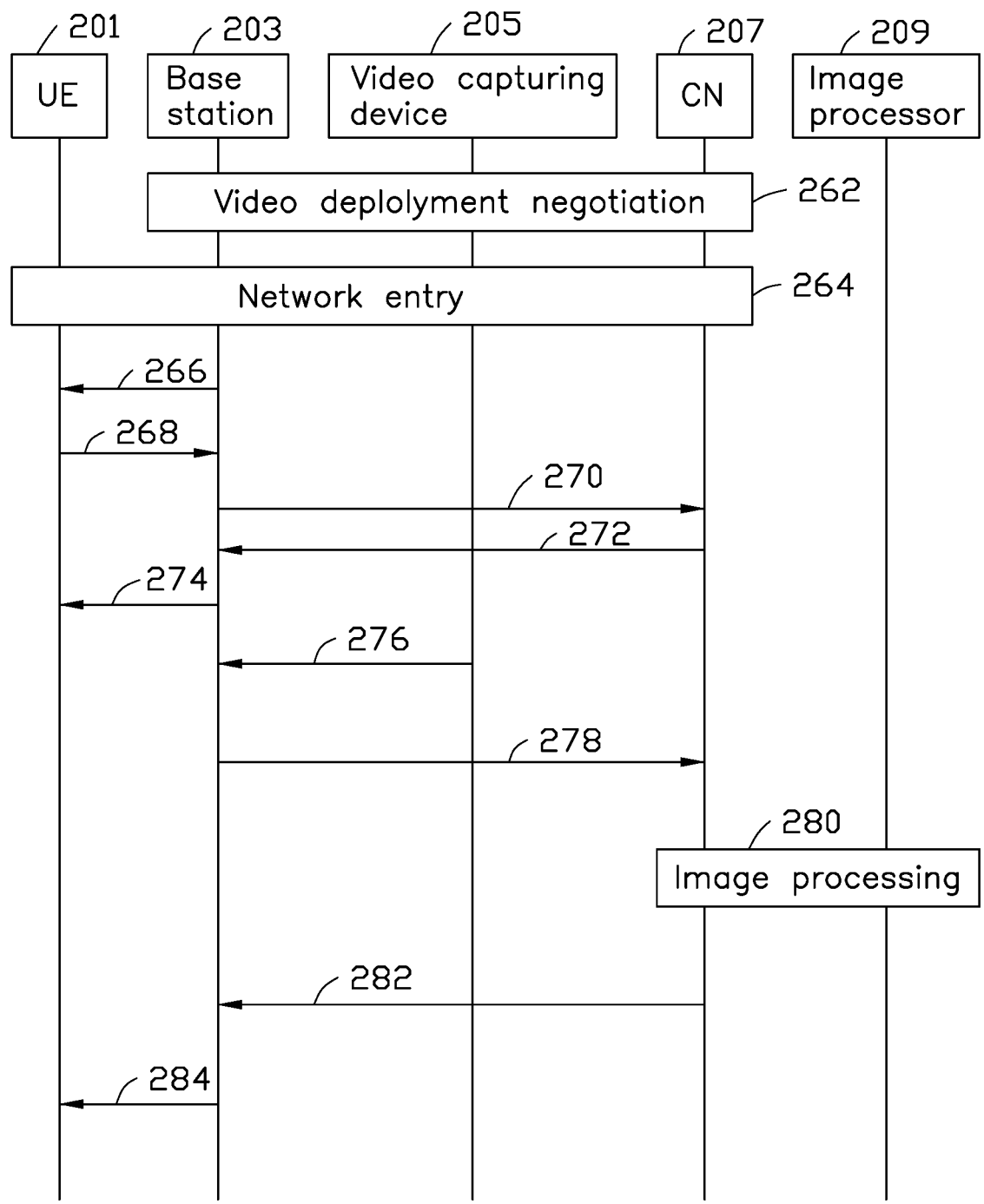
FIG. 2 is a schematic diagram illustrating a signaling procedure of a wireless communication system with a monitoring system according to an exemplary implementation of the present disclosure.

FIG. 2 is a schematic diagram illustrating a signaling procedure of a wireless communication system with a monitoring system according to another exemplary implementation of the present disclosure. The wireless communication system includes a UE 201, a base station 203, and a core network (CN 207). The monitor system includes at least one video capturing device 205 and an image processor 209.

In action 262, the base station 203 negotiates with CN 207 about the deployment of the video capturing device 205. For example, during the negotiation, information regarding the deployment details of video capturing devices 205 may be transmitted to the CN 207 from the base station 203. In one implementation, the deployment information includes the number of video capturing devices along with respective orientation and position (e.g., height) in relation to the base station 203. In yet another implementation, the deployment information includes activation/deactivation modes of the video capturing devices (e.g., on/off pattern, periodicity of filming). In some implementations, the deployment information includes a suitable image codec requirement (e.g., HEVC) and required data rate for the filming. In some other implementations, the deployment information includes the filming coverage of each video capturing device (e.g., 2 km or 4 km distance). In some other implementations, the deployment information includes the time duration of the filming that is allowed to be recorded in base station 203 (due to limited buffer size).

In action 264, the UE 201 follows a cell selection/reselection process to perform network entry for connection to the base station 203. For example, connections among the UE 201, the base station 203 and the CN 207 may be established, for example, through RRC protocol. In one implementation, the UE 201 may prefer to apply specific Public Land Mobile Network (PLMN) selection supporting the video stream applications. In one embodiment, the UE 201 may prefer to apply cell with network slicing selection supporting the video stream application.

At action 266, the base station 203 may send capability information via RRC signaling to the UE 201 after an RRC connection is established therebetween. The capability information may include, but is not limited to, a compatible video codec list, a compatible audio codec list, timing relative control information (e.g., indication of on/off pattern) and corresponding bearer information (e.g., 8K film/video stream transmission latency, required bandwidth). The signaling of the capability information may be realized by a broadcast message (e.g., other System Information (other SI)), or a dedicated unicast message. In one embodiment, the UE sends its request upon video capability and the base station may accept/reject the request according to the base station's capability.

In action 268, upon receiving the capability information, the UE 201 responds to the base station 203 by an RRC acknowledgement message for acknowledging the video stream applications. In one implementation, the RRC acknowledgement message includes the UE 201's context to facilitate the subsequent image processing. The UE 201's context may include a user profile (e.g., a user's picture).

In action 270, the base station 203 forwards the UE 201's context to CN 207 when the base station 203 receives the UE 201's context.

In action 272, the CN 207 provides video stream configurations according to the UE's context and sends it to the base station 203. In one implementation, the video stream configurations includes frequency channel parameters indicating whether a dedicated frequency band is allocated for the video stream transmission. In some implementations, the video stream configurations include radio resource parameters including the numerology, transmission power and transmission profile used for the video stream transmission.

In action 274, the base station 203 provides the video stream configurations to the UE 201 for configuring the UE 201 for adequate filming/video stream transmission and streaming.

Once the UE 201 has subscribed the video stream applications and accomplished the relevant configurations, the video capturing device 205 is activated. In action 276, the base station 203 acquires images/video streams from the video capturing device 205.

At action 278, the base station 203 further uploads the images/video streams to the CN 207. The base station 203 may buffer video streams depending on its accessible memory size and backhaul capability.

At action 280, the image processor 209 performs further image processing when the CN 207 receives the images/video streams from the base station. In some implementations, the CN 207 forwards the UE 201's context to an image processor, and the image processor identify whether an object is in the video stream in response to the user profile. In some implementations, the image processing may include, but is not limited to, procedures for interpolating, reconstructing and (de)coding caught images/video streams, correcting artifacts thereof and change to appropriate contrast, brightness and/or resolution (e.g., 8K or 4K resolution) in response to the UE 201's context.

At action 282, the CN 207 transmits the processed images/video streams to the base station 203. At action 284, the base station 203 transmits the processed images/video streams to the UE 201 in response to the video stream configuration (e.g., via the pre-configured channels and resources). In one implementation, the transmission may be initiated by a request from the UE 201. In another implementation, the transmission may be initiated automatically.

In some scenarios, the recording of video capturing device may be blocked by some other objects, such as buildings, vehicles, equipment, or other persons, and a target user/object may not be captured by the video capturing device, or the target user/object may not be identified from the captured video streams. A further enhancement for the monitoring system is described in details below.

Figure 3:
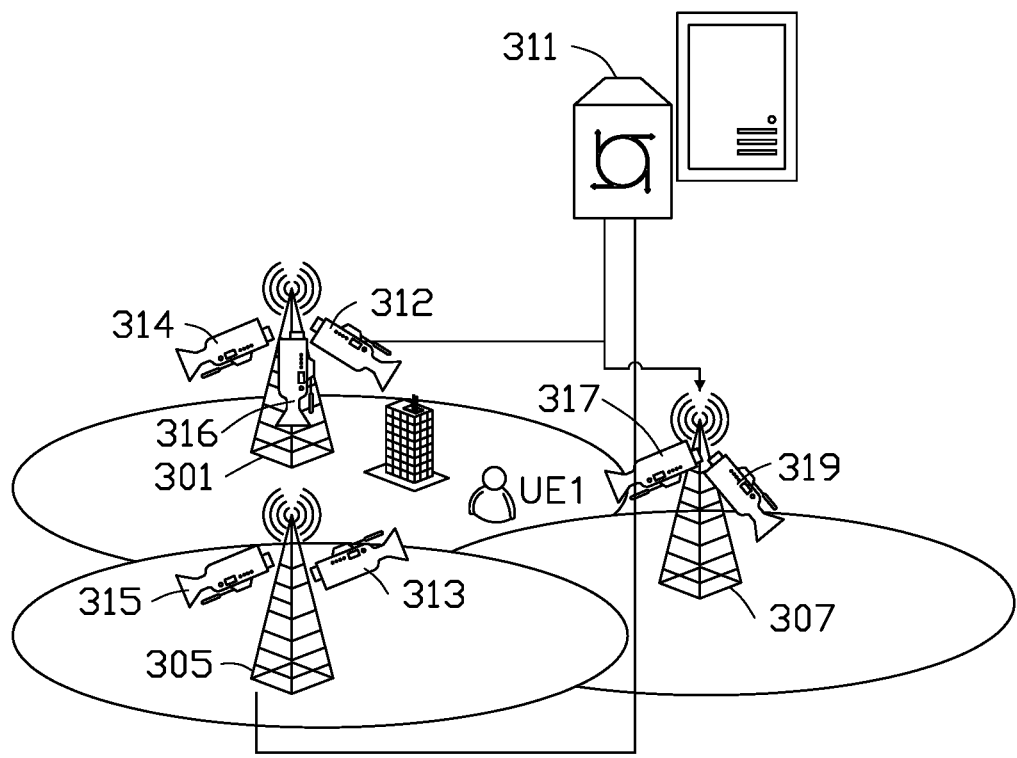
FIG. 3 is a schematic diagram illustrating a monitoring system with video capturing devices according to an exemplary implementation of the present disclosure.

FIG. 3 illustrates a monitoring system with video capturing devices according to an exemplary implementation of the present disclosure. Each base station is equipped with multiple video capturing devices. For example, video capturing devices 312, 314, and 316 are configured on a base station 301. Video capturing devices 313 and 315 are configured on a base station 305. Video capturing devices 317 and 319 are configured on the base station 307. The core network 311 may apply coordination to the base stations 301, 305, and 307 to select the suitable video capturing device to capture a target UE 1.

In FIG. 3, UE 1 camps on the base station 301. However, the video capturing device 312 configured on the base station 301 cannot capture the UE 1 since the UE 1 is blocked by a building. In one implementation, UE 1 may send a request to the base station 301 to acquire another video stream from another video capturing device configured on the same base station. For example, the base station 301 selects another video capturing device (313 or 317) in response to the position. In one implementation, a capturing configuration for the video capturing device may be determined, and sent to the selected video capturing device. For example, the base station 301 adjusts the direction or resolution of the video capturing device in response to the position. And then, the selected video capturing device capture the video stream in response to the capturing configuration (e.g., direction or resolution).

In another implementation, UE 1 may send a request to the base station 301 to acquire a video stream from another base station. The base station 301 may identify a suitable base station 305 or 307 with their respective video capturing devices 313 or 317 according to, for example, a measurement report provided by the UE 1. Once the coordination is established between the base stations 301, 305, 307, and the CN 311, the base station 305 and base station 307 may upload the recorded video streams to the CN 311. The CN 311 may forward the two video streams to base station 301, and the base station 301 may select the better video stream in response to the quality or the target object/user in the video streams and transmit the selected video stream to UE 1.

In another implementation, the base station 301 may send all of the video streams to UE 1 through different channels. Then, the UE 1 may select which video stream to display.

In yet another implementation, the CN 311 may combine all of the video streams and apply a proper image processing to enhance the quality of the combined video stream. Then, the CN 311 transmits the processed video stream to the base station 301, which transmits it to the UE 1.

Figure 4:
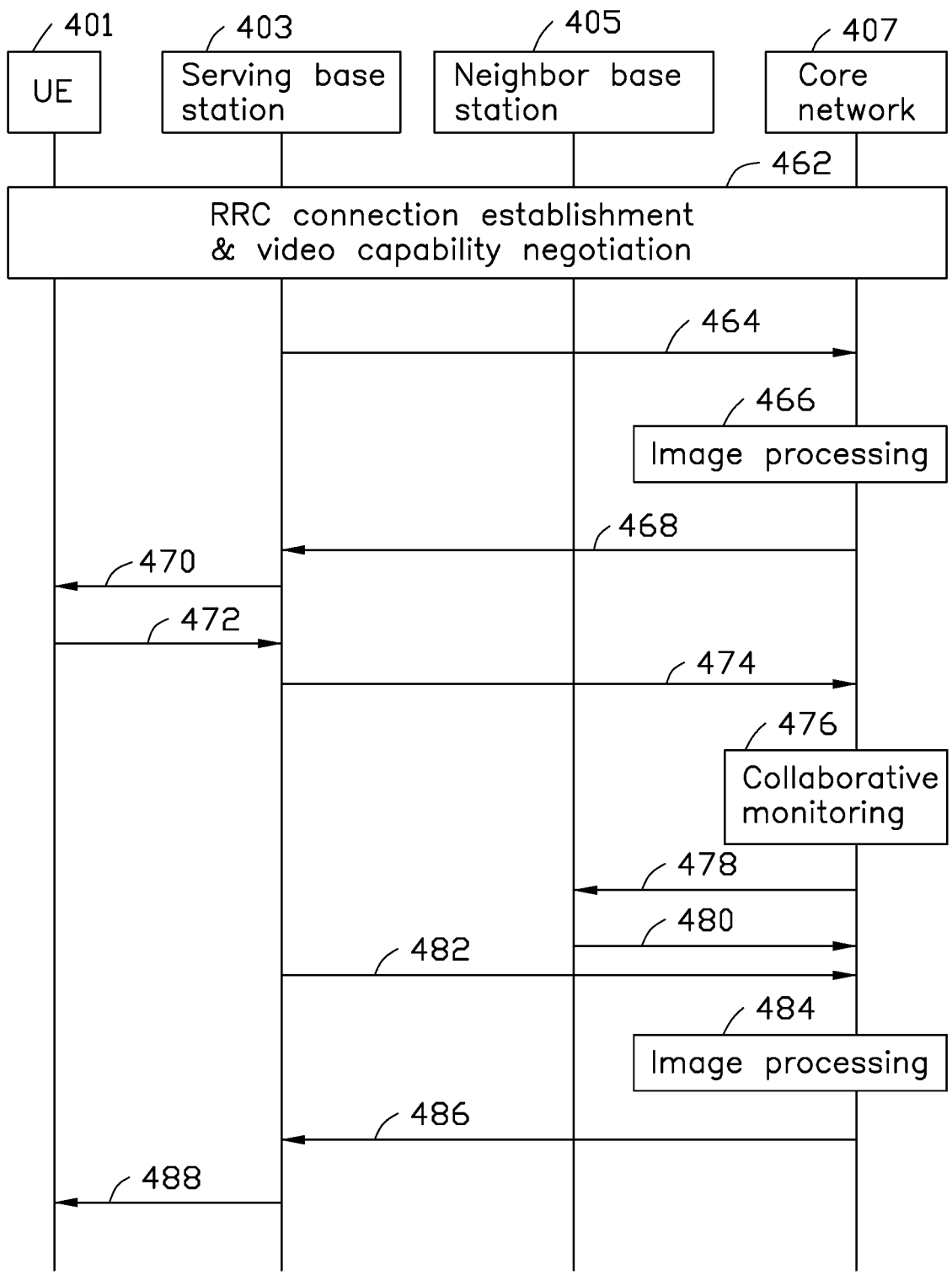
FIG. 4 is a schematic diagram illustrating a signaling procedure of a wireless communication system with a monitoring system according to an exemplary implementation of the present disclosure.

FIG. 4 illustrates a signaling procedure of a wireless communication system with a monitoring system according to an exemplary implementation of the present disclosure. The wireless communication system includes a serving base station 403 equipped with at least one video capturing device, a neighbor base station 405 equipped with at least one video capturing device, a core network (CN) 407 and a UE 401. The CN 407 integrates image processing function in this implementation. In some other implementations, an image processing function may be not integrated into the CN 407 and an image processor is required to perform the image processing and is communicatively coupled to CN 407.

At action 462, the UE 401 establishes an RRC connection with the serving base station 403 based on cell selection/reselection, and performs video capability negotiation with the serving base station 403, the neighbor base station 405 and CN 407.

At action 464, the serving base station 403 uploads a video stream recorded by a specific video capturing device to the CN 407. In one implementation, the CN 407 is coupled to the base station 403 and the base station 405.

At action 466, the CN 407 performs image processing on the video stream after receiving it from the serving base station 403. The image processing may include user's picture identification, tracing and compression of video contents.

At action 468, the CN 407 transmits the processed video stream to the serving base station 403. The transmission could be achieved via fiber or wireless backhaul. The processed video stream may be re-formatted as IP package or specific transmission format.

At action 470, the serving base station 403 transmits the received video stream to the UE 401 via configured channels and resources. The channel and/or resource configurations may be provided in action 462.

After the video stream is received, the UE 401 decodes the video stream and determines whether a target object/user in the video stream is clear. In one implementation, the UE identifies whether the target object/user is unclear or is being blocked/obstructed by other items. In another implementation, the user decides whether the target object/user is clear and/or decides whether to request another video stream. When the target object/user is not clear, at action 472, the UE 401 may send a request to the serving base station 403 for another video stream from other sources (e.g., video capturing devices and/or base stations).

At action 474, the serving base station 403 forwards the request to the CN 407 to initiate a collaborative monitoring.

At action 476, the CN 407 identifies other video capturing devices configured on the on base stations appropriate for the collaborative monitoring to obtain a video stream having an unobstructed view of the target, and/or to enhance the video stream quality.

At action 478, the CN 407 sends a video upload request and corresponding video requirements to the identified base station 405.

At action 480, the identified base station 405 acquires the video stream from one video capturing device configured thereon, and transmits the video stream to the CN 407.

At action 482, the serving base station 403 may upload the video stream to the CN 407 again.

At action 484, after the CN 407 receives respective video streams from the base station 403 and the base station 405, it may perform image processing on the two video streams. For example, image stitching is performed to create a single combined video stream. In another example, an image processing is performed on the two video streams to improve the quality.

At action 486, the CN 407 transmits the processed video stream to the base station 403.

At action 488, the base station 403 provides an updated video stream to the UE 401 via configured channels and resources. The updated video stream may be displayed on the UE screen with higher quality or with a clear/unobstructed view of the target object/user.

In some implementations, the base station 405 may be a mobile base station (e.g., a drone) that carries an video capturing device with NR basebands. The base station 405 navigates in NR baseband communication with the CN and the image processor 407 via a Uu interface, a PC5 interface or a specific NR air interface. Thus, it is expected that no image blockage would happen to the base station 405 and the corresponding video capturing device.

Figure 5:
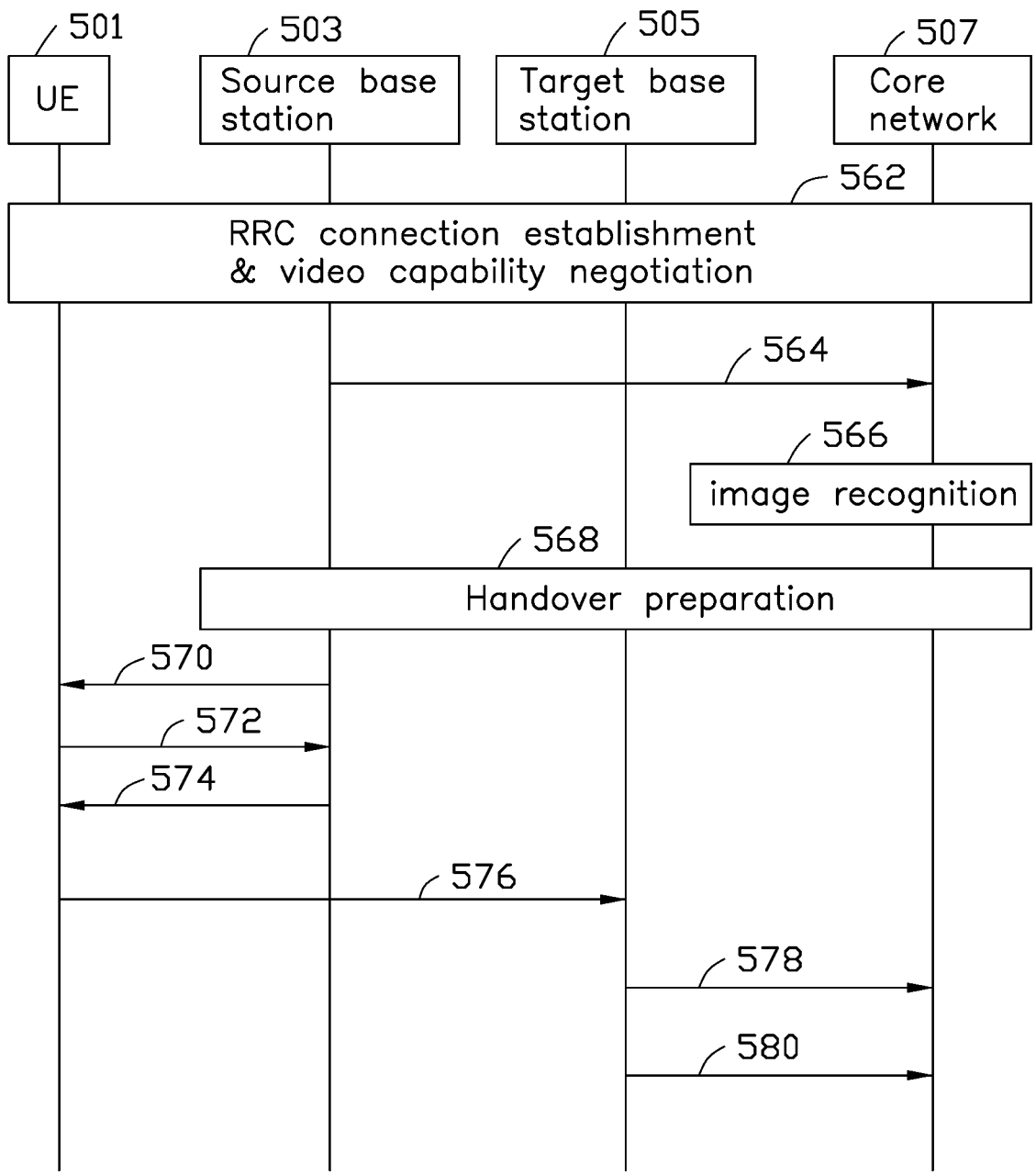
FIG. 5 is a schematic diagram illustrating a handover procedure of a wireless communication system with a monitoring system according to an exemplary implementation of the present disclosure.

FIG. 5 is a schematic diagram illustrating a handover (HO) procedure of a wireless communication system with a monitoring system according to an exemplary implementation of the present disclosure. The wireless communication system includes a UE 501, a source base station 503 equipped with at least one video capturing device, a target base station 505, and a core network (CN) 507. The CN 507 integrates image processing function in this implementation. In some other implementations, an image processing function may be not integrated into the CN 507 and an image processor is required to perform the image processing and is communicatively coupled to CN 507.

In this implementation, a trajectory/movement of a target object/user may be tracked or identified in response to the content of the video stream. For instance, according to the UE's motion and speed recorded in the video stream, the source base station 503 may anticipate that an HO procedure will be required by the UE 501 in the following time slots, and may identify a target base station 505 for the UE 501. Thus, the source base station 503 may prepare for handover or conditional handover such that the HO related configurations and path switching may be accomplished before the UE 501 sends a measurement report to the source base station 503. As such, a seamless HO procedure may be achieved.

In action 562, the UE 501 establishes an RRC connection with the base station, and performs a video capability negotiation among the UE 501, the base station 503, the base station 505 and CN 507. In one implementation, the UE 501 may not be configured with video decoding capability. In another implementation, the UE 501 may upload its context for video image monitoring (by the network).

At action 564, the source base station 503 uploads the video stream to the CN 507.

At action 566, the CN 507 may perform computer vision functions for the UE and apply algorithm to predict the trajectory/movement of the target object/user, e.g., by its speed and direction in the video stream.

At action 568, when the CN 507 determines that the UE 501 is leaving the coverage of the serving base station 503 in response to the trajectory tracking, the CN 507 requests an HO preparation from the serving base station 503 to the target base station 505. During the HO preparation, the CN 507 may establish a specific data path with the target base station 505, and the source base station 503 may exchange the UE's context (including security profile) with the target base station 505. In some implementation, the target base station 505 may provide its RRC configuration or relevant system information to the source base station 503.

At action 570, the source base station 503 configures HO parameters for the UE 501 when a request is received from the image processor (e.g., action 568). For example, the HO parameters including information regarding the target base station 505 may be provided to the UE 501.

At action 572, after receiving the HO parameters, the UE 501 may follow the measurement configurations to report measurement results to the source base station 503.

At action 574, upon receiving the measurement results, the serving base station 503 may send an HO command to the UE 501 to trigger the HO procedure. In one implementation, the HO command may be a MAC Control Element (CE) instead of an RRC message since all the relevant information required for HO was provided in action 570.

At action 576, the UE 501 attempts to synchronize with the target base station 505 after receiving the HO command. When a successful association is established, the UE 501 may send an RRC configuration complete message to acknowledge the HO procedure to the target base station 505.

At action 578, the target base station 505 sends an HO complete message to the image processor 507 to notify the mobility change associated to the UE 501.

At action 580, the target base station 505 uploads the video stream to the image processor 507. In some implementations, and the target base station 505 may repeat similar actions as described above with regard to the HO procedure when the UE 501 is travelling out of coverage of the target base station 505. In another embodiment, the beam sweeping could be achieved by tracking UE's trajectory via the video streaming record wherein the CN or base station could identify the UE moving from one specific angle to another within an BS and then provide the corresponding TCI state to the UE.

Figure 6:
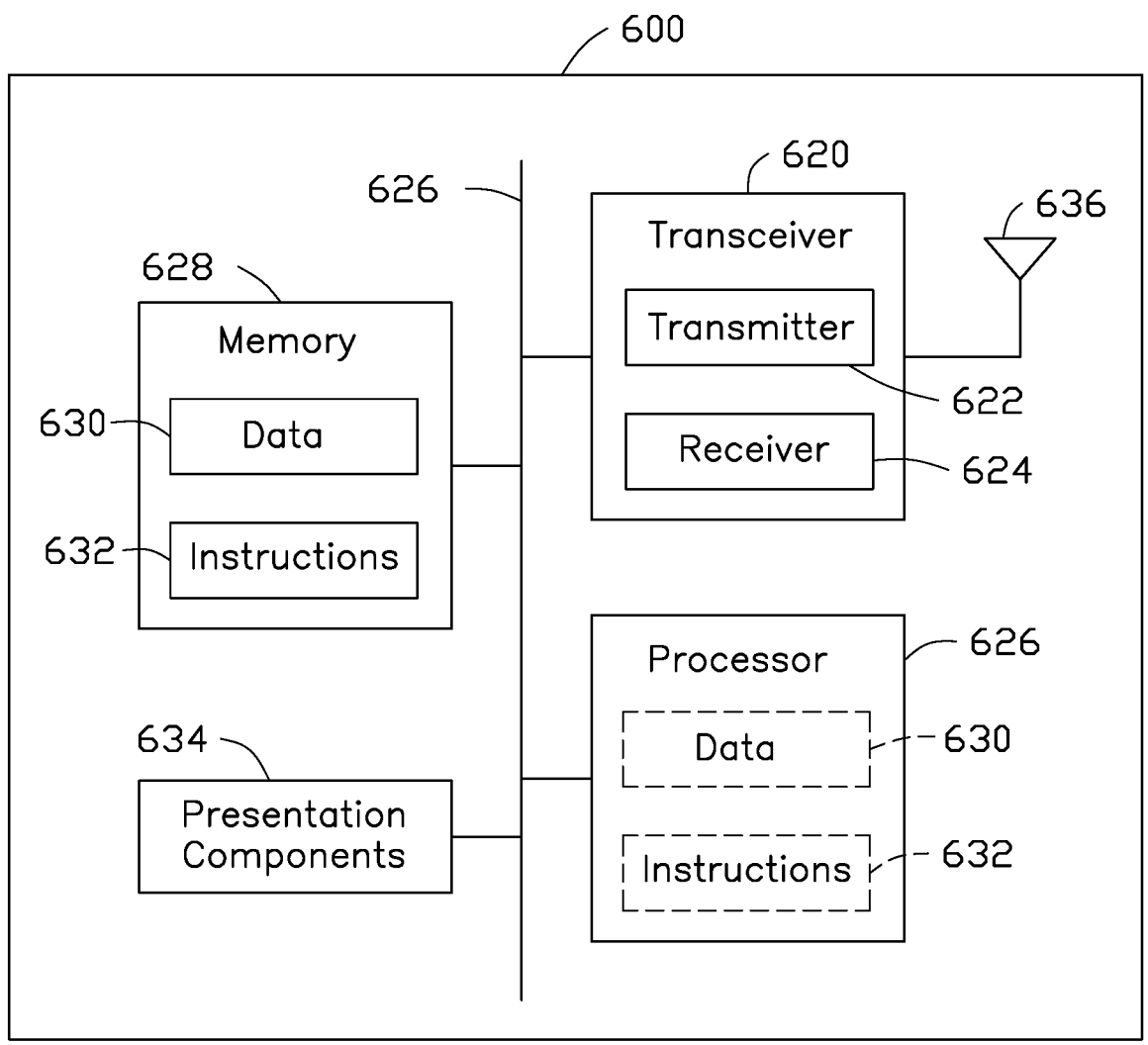
FIG. 6 is a block diagram illustrating a device for wireless communication, according to various exemplary implementations of the present disclosure.

FIG. 6 illustrates a block diagram of a device for wireless communication, according to various exemplary implementations of the present disclosure. As shown in FIG. 6, device 600 may include transceiver 620, processor 626, memory 628, one or more presentation components 634, and at least one antenna 636. Device 600 may also include an RF spectrum band module, a base station communications module, a network communications module, and a system communications management module, input/output (I/O) ports, I/O components, and power supply (not explicitly shown in FIG. 6). Each of these components may be in communication with each other, directly or indirectly, over one or more buses 626.

Transceiver 620 having transmitter 622 and receiver 624 may be configured to transmit and/or receive time and/or frequency resource partitioning information. In some implementations, transceiver 620 may be configured to transmit in different types of subframes and slots including, but not limited to, usable, non-usable and flexibly usable subframes and slot formats. Transceiver 620 may be configured to receive data and control channels.

Device 600 may include a variety of computer-readable media. Computer-readable media can be any available media that can be accessed by device 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 628 may include computer-storage media in the form of volatile and/or non-volatile memory. Memory 628 may be removable, non-removable, or a combination thereof. Exemplary memory includes solid-state memory, hard drives, optical-disc drives, and etc. As illustrated in FIG. 6, memory 628 may store computer-readable, computer-executable instructions 632 (e.g., software codes) that are configured to, when executed, cause processor 626 to perform various functions described herein, for example, with reference to FIGS. 1 through 5. Alternatively, instructions 632 may not be directly executable by processor 626 but be configured to cause device 600 (e.g., when compiled and executed) to perform various functions described herein.

Processor 626 may include an intelligent hardware device, e.g., a central processing unit (CPU), a microcontroller, an ASIC, and etc. Processor 626 may include memory. Processor 626 may process data 630 and instructions 632 received from memory 628, and information through transceiver 620, the base band communications module, and/or the network communications module. Processor 626 may also process information to be sent to transceiver 620 for transmission through antenna 636, to the network communications module for transmission to a core network.

One or more presentation components 634 presents data indications to a person or other device. Exemplary one or more presentation components 634 include a display device, speaker, printing component, vibrating component, and etc.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A base station comprising:
   a non-transitory machine-readable medium storing computer-executable instructions;
   a processor coupled to the non-transitory computer-readable medium, and configured to execute the computer-executable instructions to:
   receive beam related information from a user equipment (UE);
   determine a position of the UE in response to the beam related information; and
   acquire a video stream from at least one video capturing device configured on the base station in response to the position;
   send capability information of the at least one video capturing device via radio resource control (RRC) signaling to the UE;
   receive an RRC acknowledgement message from the UE, the RRC acknowledgement message including a user profile; and
   transmit the user profile to an image processor, the user profile including a picture of a user of the UE.

2. The base station of claim 1, wherein the processor is further configured to execute the computer-executable instructions to:
   send a video stream configuration to the UE;
   send the video stream to an image processor;
   receive a processed video stream from the image processor; and
   send the processed video stream to the UE in response to the video stream configuration.

3. The base station of claim 2, wherein the video stream configuration includes at least one of a channel parameter and a resource parameter.

4. The base station of claim 1, wherein the processor is further configured to execute the computer-executable instructions to:
   select one video capturing device in response to the position; and
   send a capturing configuration to the selected video capturing device;

wherein a video stream is captured by the selected video capturing device in response to the capturing configuration.

5. The base station of claim 1, wherein the processor is further configured to execute the computer-executable instructions to:
acquire another video stream from another network entity, wherein the another video stream is captured by at least another video capturing device configured on another base station.

6. The base station of claim 1, wherein the processor is further configured to execute the computer-executable instructions to perform a handover procedure when a request is received from an image processor.

7. The base station of claim 6, wherein the request is generated when an image processor determines that the UE is leaving a coverage of the base station.

8. A user equipment (UE) comprising:
a non-transitory machine-readable medium storing computer-executable instructions;
a processor coupled to the non-transitory computer-readable medium, and configured to execute the computer-executable instructions to:
transmit beam related information to a base station, wherein at least one video capturing device is configured on the base station;
receive a capability information of the at least one video capturing devices via radio resource control (RRC) signaling;
receive a video stream from the base station in response to the capability information;
send an RRC acknowledgement message to the base station, the RRC acknowledgement message including a user profile;
transmit the user profile to an image processor, the user profile including a user's picture of the UE;
receive a video stream configuration from the base station; and
receive the video stream from the base station in response to the video stream configuration;
wherein the video stream configuration includes at least one of a channel parameter and a resource parameter.

9. The UE of claim 8, wherein the processor is further configured to execute the computer-executable instructions to:
receive another video stream from another base station, wherein the another video stream is captured by at least another video capturing device configured on the another base station.

10. A monitoring system comprising:
a non-transitory machine-readable medium storing computer-executable instructions;
a processor coupled to the non-transitory machine-readable medium, and configured to execute the computer-executable instructions to:

receive beam related information of a user equipment (UE) from a base station coupled to the UE;
determine a position of the UE in response to the beam related information;
receive a video stream from at least one video capturing device configured on the base station in response to the position;
send capability information of the at least one video capturing device via radio resource control (RRC) signaling to the UE;
receive an RRC acknowledgement message from the UE, the RRC acknowledgement message including a user profile; and
transmit the user profile to an image processor, the user profile including a picture of a user of the UE.

11. The monitoring system of claim 10, wherein the processor is further configured to execute the computer-executable instructions to send a capability information of the at least one video capturing device to the base station.

12. The monitoring system of claim 10, wherein the processor is further configured to execute the computer-executable instructions to:
receive a user profile from the base station; and
identify whether an object is in the video stream in response to the user profile.

13. The monitoring system of claim 10, wherein the processor is further configured to execute the computer-executable instructions to:
perform image processing to the video stream; and
send a processed video stream to the base station.

14. The monitoring system of claim 10, wherein the processor is further configured to execute the computer-executable instructions to:
receive another video stream from another network entity, wherein the another video stream is captured by at least another video capturing device configured on another base station.

15. The monitoring system of claim 10, wherein the processor is further configured to execute the computer-executable instructions to:
receive multiple video streams from at least one base station; and
select one video stream in response to a user profile and a quality of the video streams.

16. The monitoring system of claim 10, wherein the processor is further configured to execute the computer-executable instructions to:
track a trajectory of an object in the video stream;
identify whether a location of the object is leaving a coverage of the base station in response to the trajectory of the object;
send a request to the base station when the location of the object is leaving the coverage of the base station; and
trigger a handover process the UE by the base station.

* * * * *